May 17, 1955 W. GUSTAFSON 2,708,444
MATERIAL TREATING MACHINE
Filed April 13, 1954 6 Sheets-Sheet 1
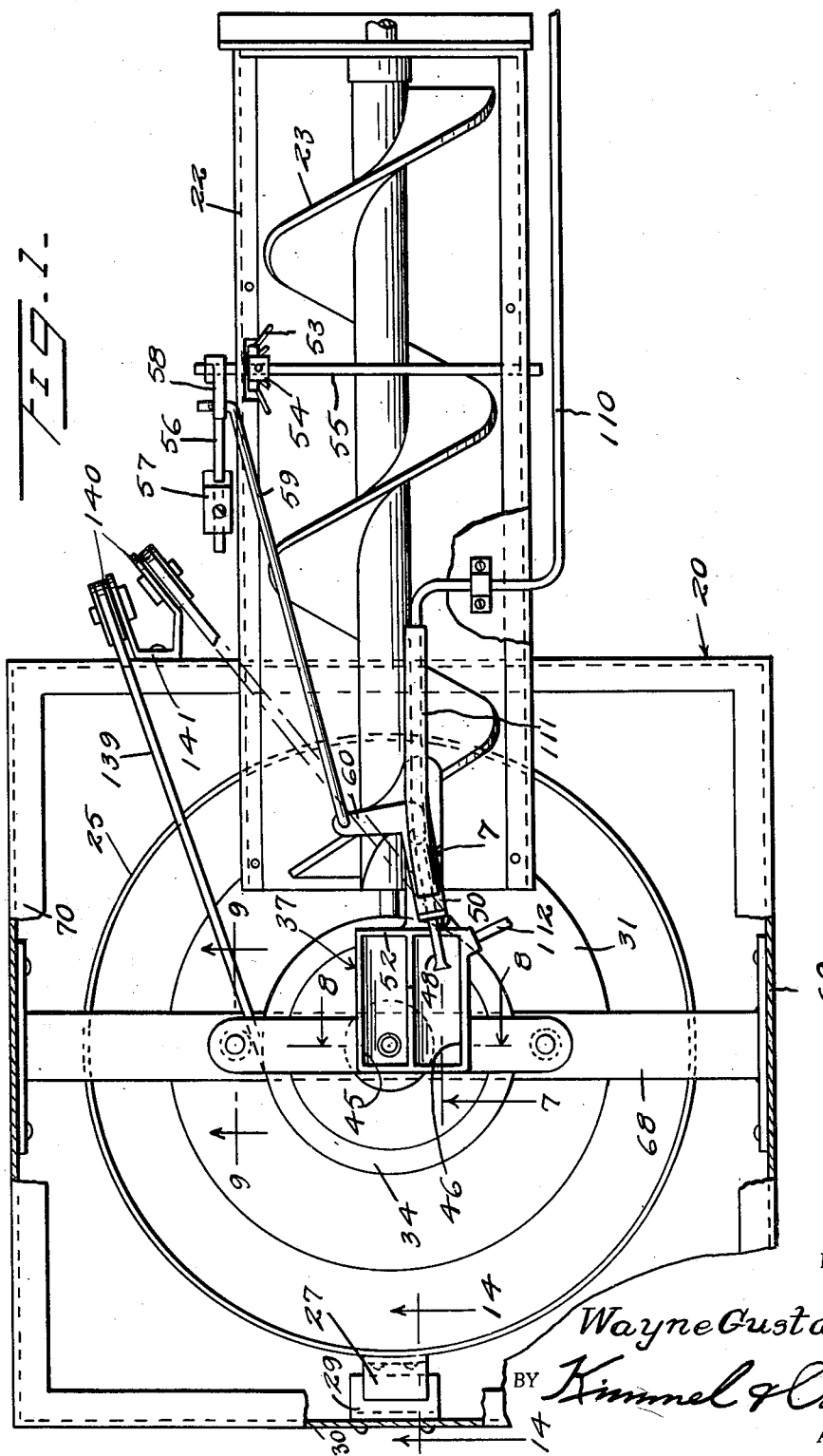
INVENTOR
Wayne Gustafson
BY Kimmel & Crowell
ATTORNEYS

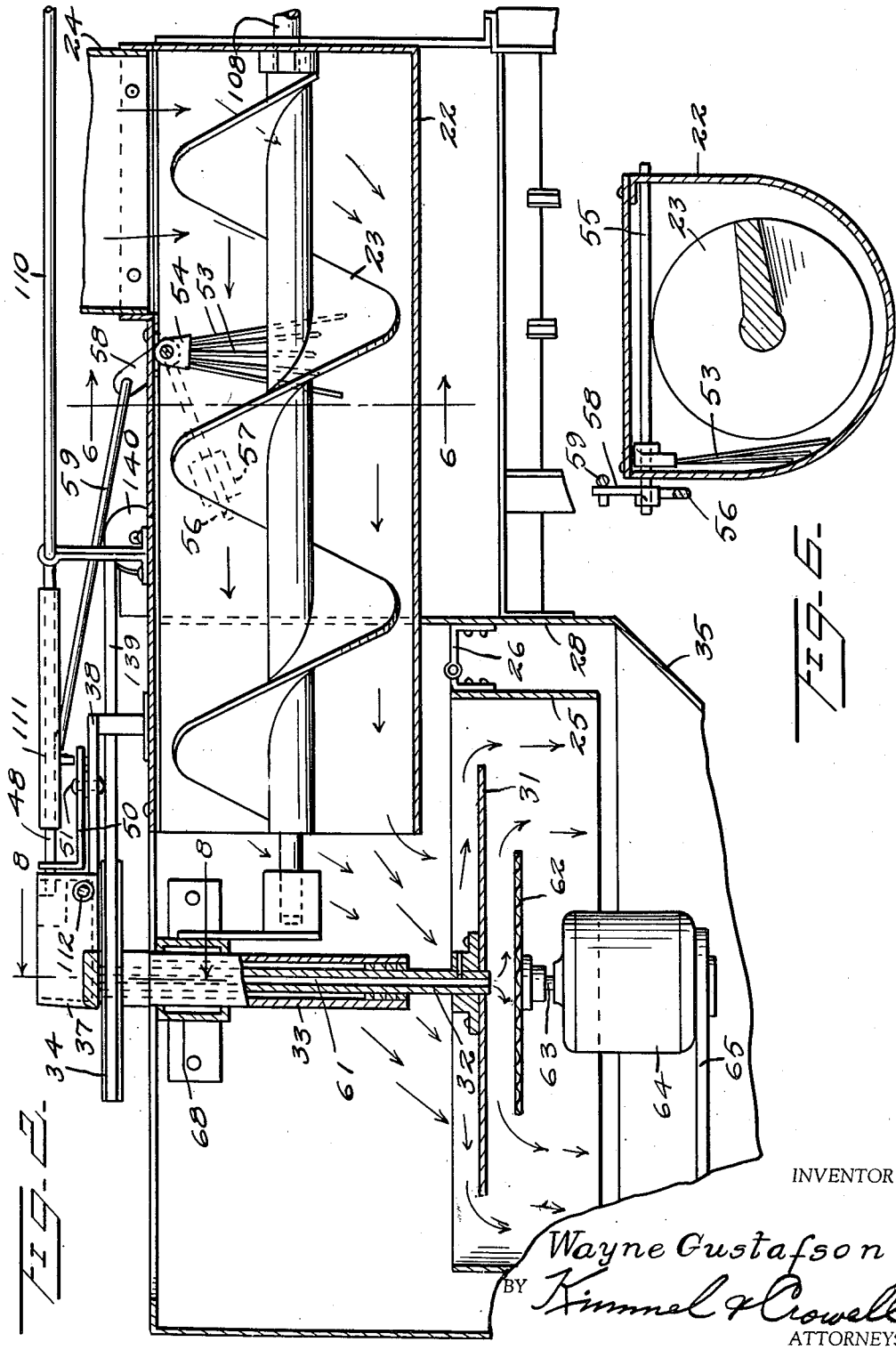

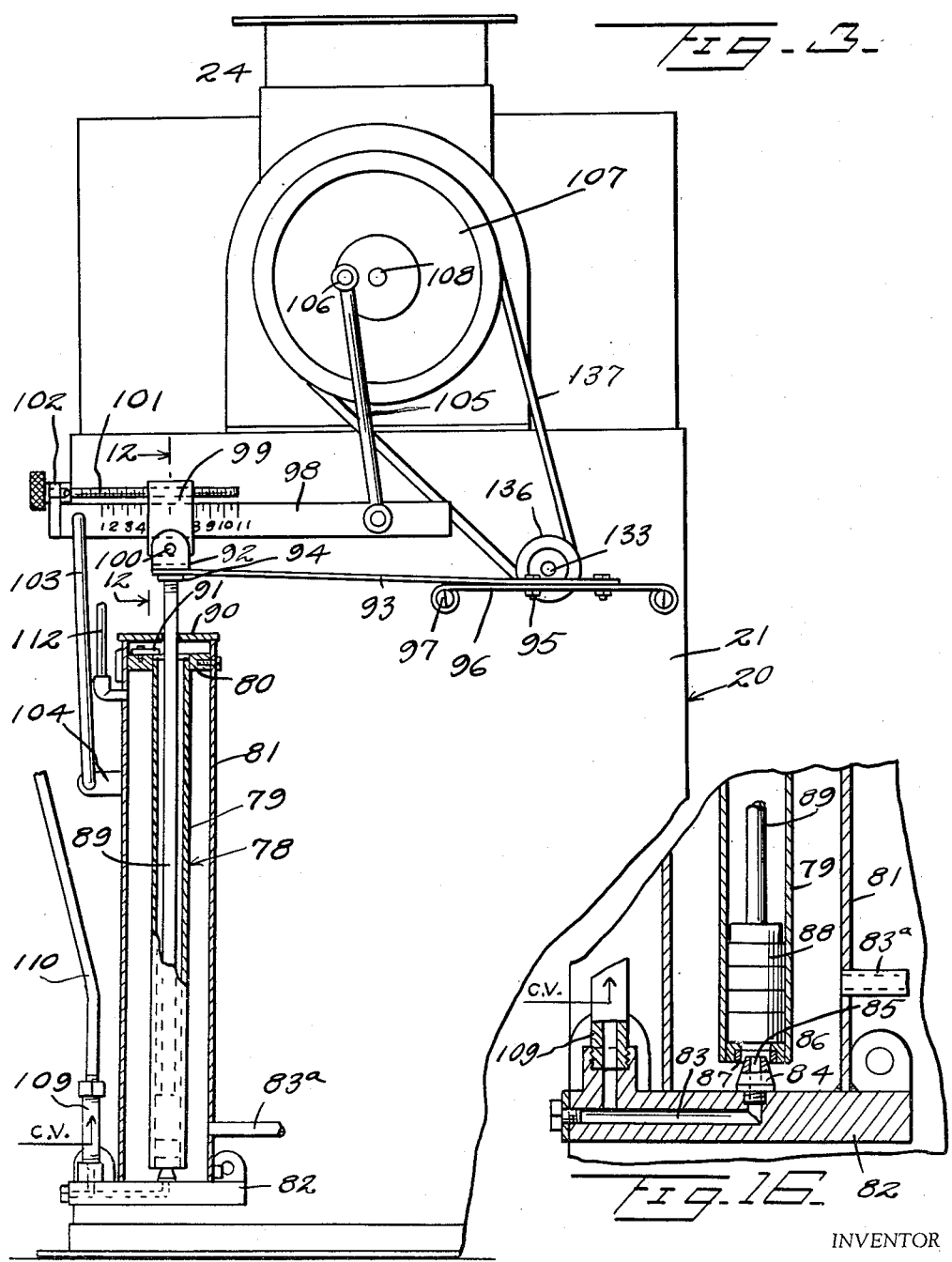

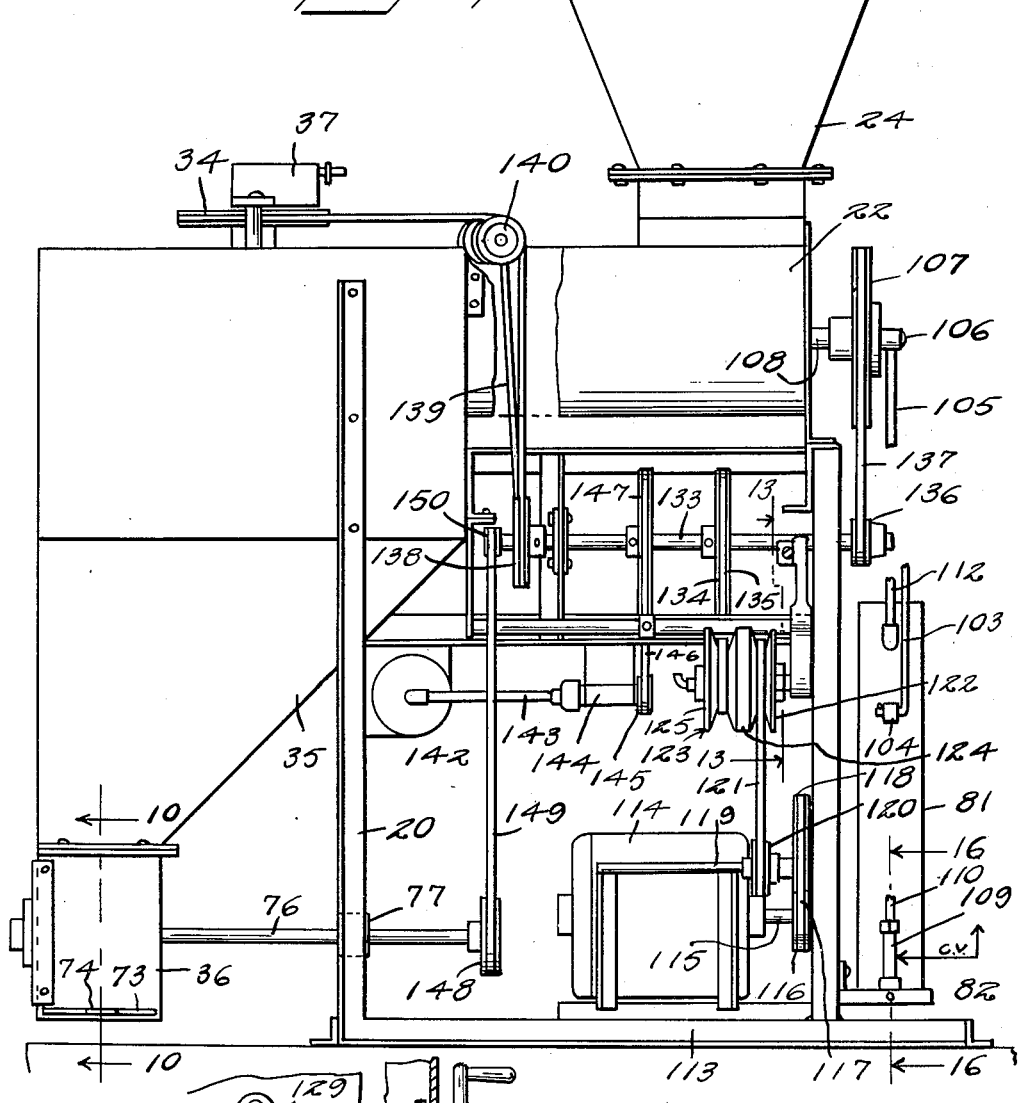

May 17, 1955 W. GUSTAFSON 2,708,444
MATERIAL TREATING MACHINE
Filed April 13, 1954 6 Sheets-Sheet 5
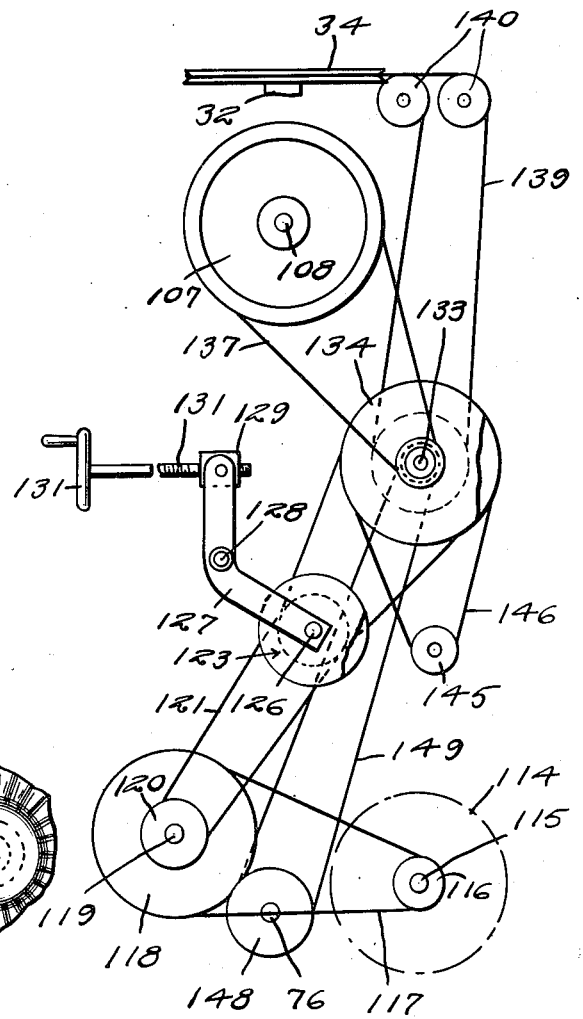
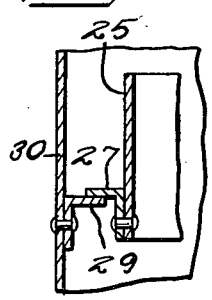
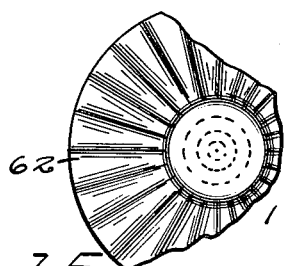
INVENTOR
Wayne Gustafson
BY Kimmel & Crowell
ATTORNEYS

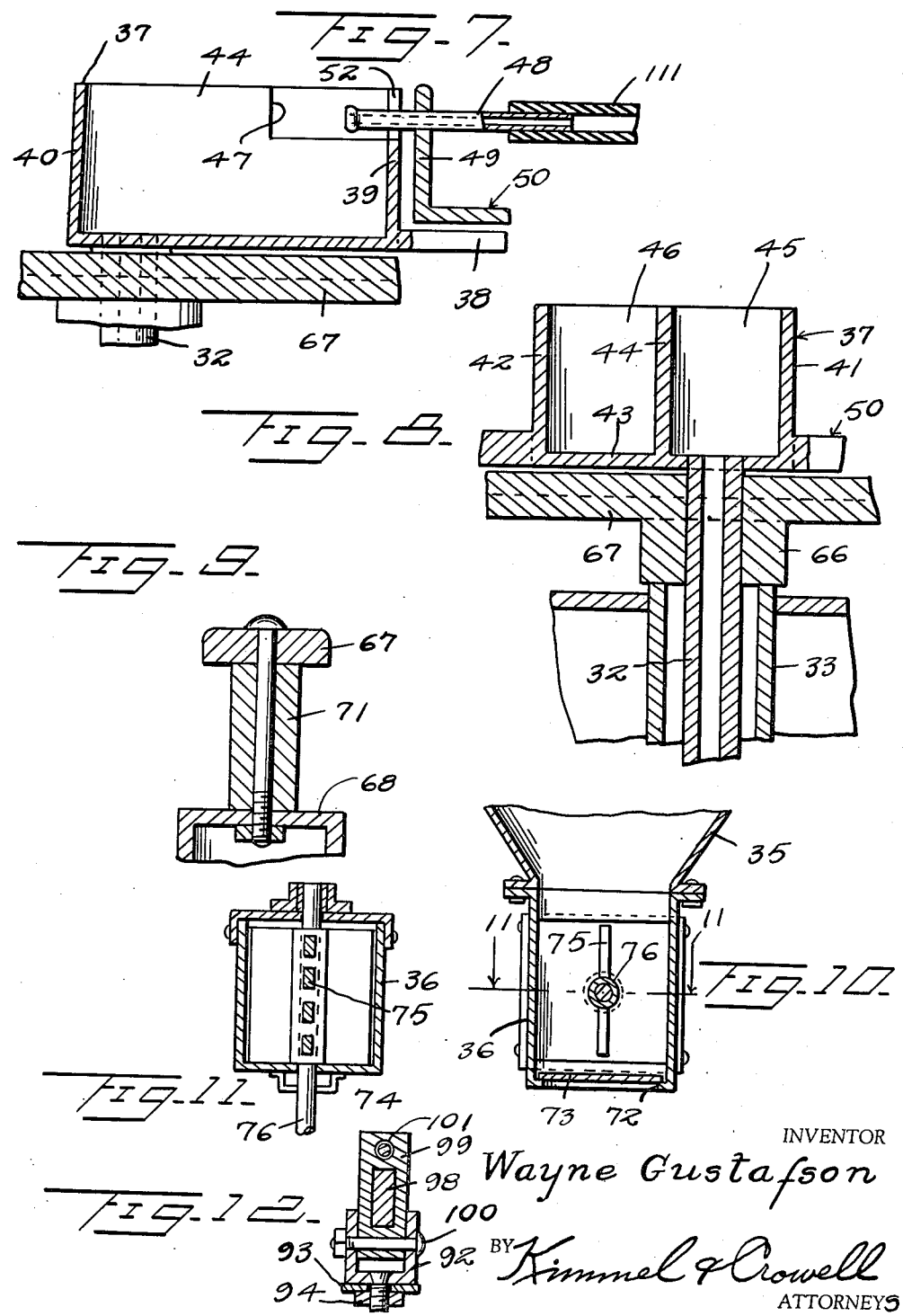

United States Patent Office 2,708,444
Patented May 17, 1955

2,708,444

MATERIAL TREATING MACHINE

Wayne Gustafson, Moorhead, Minn.

Application April 13, 1954, Serial No. 422,946

4 Claims. (Cl. 134—46)

This invention relates to a material treating machine.

An object of this invention is to provide a machine which, for example, may be used for treating or coating seed with a chemical insecticide or fungicide whereby the seed will germinate and the plant thereby produced will be a healthy plant.

Another object of this invention is to provide a seed or other material treating machine wherein the seed is passed through a mist or vapor containing an insecticide or fungicide so that the seed will be evenly coated, and the coating operation may be continuous and rapid.

A further object of this invention is to provide an automatically operable means for cutting off the chemical supply when no seed is passing through the machine.

A further object of this invention is to provide in a seed treating machine an improved adjustable pump so that a predetermined quantity of liquid will be used for particular seeds and for predetermined speeds.

A further object of this invention is to provide a seed treating machine wherein the flow of chemical to the distributor is controlled by movement of the seed or other material by a conveyor, the absence of seed or material in the conveyor effecting cut off of the chemical to the distributor and return of the chemical to the metering pump.

With the above and other objects in view, my invention consists in the arrangement, combination and details of construction disclosed in the drawings and specification, and then more particularly pointed out in the appended claims.

In the drawings:

Figure 1 is a plan view, partly broken away and in section, of a seed treating machine constructed according to an embodiment of this invention.

Figure 2 is a fragmentary vertical section through the center portion of the machine.

Figure 3 is an end elevation, partly in section, of the machine.

Figure 4 is a detail front elevation of the invention.

Figure 5 is a diagrammatic view showing the driving means for the machine.

Figure 6 is a sectional view taken on the line 6—6 of Figure 2.

Figure 7 is a fragmentary sectional view on an enlarged scale taken on the line 7—7 of Figure 1.

Figure 8 is a fragmentary sectional view taken on the line 8—8 of Figures 1 or 2.

Figure 9 is a fragmentary sectional view taken on the line 9—9 of Figure 1.

Figure 10 is a fragmentary sectional view taken on the line 10—10 of Figure 4.

Figure 11 is a fragmentary sectional view taken on the line 11—11 of Figure 10.

Figure 12 is a fragmentary sectional view taken on the line 12—12 of Figure 3.

Figure 13 is a fragmentary sectional view taken on the line 13—13 of Figure 4.

Figure 14 is a sectional view taken on the line 14—14 of Figure 1.

Figure 15 is a fragmentary plan view of the fluid vaporizing member.

Figure 16 is a fragmentary sectional view on an enlarged scale taken on the line 16—16 of Figure 4.

Referring to the drawings, the numeral 20 designates generally a frame structure which is enclosed within the jacket 21. The frame structure 20 has mounted on the upper portion thereof a horizontally disposed conveyor trough 22 within which a screw conveyor 23 is rotatably disposed. A hopper 24 extends upwardly from the top and outer portion of trough 22 and is adapted to discharge seed or other material into the outer end portion of trough 22 for movement lengthwise of the trough.

The material moved lengthwise or inwardly of trough 22 is discharged into a mixing cylinder 25 which is supported by means of brackets 26 and 27. The bracket 26 is secured to a rear wall 28 and bracket 27 is supported from a supporting bracket 29 fixed to a forward wall 30.

A seed distributing disc 31 is secured to a vertically disposed tubular shaft 32 which is journalled in a vertically disposed bearing 33. The disc 31 underlies the inner or forward end of the trough 22 so that the seed or other material discharged from trough 22 will be dropped onto the distributor 31 and the seed or material will then be thrown outwardly and will impinge the inner surface of mixing cylinder 25. The upper end of shaft 32 has secured thereto a grooved pulley 34 which is driven as will be hereinafter described.

A receiving hopper 35 is disposed below the mixing cylinder or chamber 25 and the now treated seed moves downwardly into a collector 36 disposed at the lower end of the hopper 35.

In order to provide a means whereby the seed discharged within the cylinder or mixing member 25 will be treated by a germicide or fungicide, I have provided a receptacle generally indicated at 37 which is secured to a supporting bar 38 and overlies the upper end of shaft 33. The receptacle 37 is formed of front and rear walls 39 and 40, opposite side walls 41 and 42, and a bottom wall 43.

A partition 44 extends lengthwise between the front and rear walls 39 and 40 thereby dividing the receptacle 37 into a delivery chamber 45 and a return chamber 46. The partition 44 is formed with a cut-out 47, the purpose for which will be hereinafter described.

A fluid delivery nozzle 48 extends through the upright side 49 of an L-shaped lever 50 which is rockably mounted on a pivot 51 carried by the supporting bar 38. The inner or forward end of the nozzle 48 extends through an opening 52 formed in the upper portion of wall 39 so that nozzle 48, upon horizontal swinging of lever 50, may be disposed or discharged into delivery chamber 45 or into return chamber 46.

Lever 50 is adapted to be rocked by means of depending rods or fingers 55 secured to a block 54 which is fixed on a horizontal rock shaft 55. Shaft 55 is journalled across the upper portion of trough 22 and the fingers or feelers 53 are disposed along one side of trough 22 out of the path of screw 23 and are adapted to be engaged by the seed or material which is moved forwardly in the trough 22.

A lever or arm 56 is fixed to the outer end of shaft 55 and has a weight 57 adjustably mounted therein. Weight 57 gravitatingly urges shaft 55 to rock in a counter-clockwise direction. A forwardly projecting lever arm 58 extends from the inner end of lever 56 and a link or rod 59 is pivotally secured at one end to arm 58 and is pivotally secured at its other or forward end to an angularly disposed arm 60 which extends from the rear portion of lever 50.

When seed or material is in the trough 22 and is being moved forwardly by conveyor screw 23, fingers 53 will be moved forwardly and shaft 55 will be rocked clockwise, as viewed in Figure 1, so that nozzle 48 will be swung from return chamber 46 to delivery chamber 45. The fluid will then be discharged into delivery chamber 45 and will gravitatingly flow downwardly through the bore 61 of shaft 32.

A radially ribbed or corrugated vaporizing plate 62 is disposed below the lower end of shaft 32 and below distributing disc 31. Disc 62 is secured to the upper end of a motor shaft 63 operated by a motor 64. Motor 64 is supported by means of a supporting arm 65.

Disc 62 is substantially smaller in diameter than disc 31 and is adapted to broadcast the vaporized fluid outwardly within the mixing member 25 in order that the scattered seed will pass through the mist or vapor and will thereby be coated with the germicide or fungicide.

The upper end of shaft 32 is journalled through a bearing 66 carried by a supporting bar 67 which is fixed to a transverse channel member 68. The channel member 68 is fixed between the front and rear walls 69 and 70. Spacer members 71 are interposed between the bar 67 and the channel member 68, as shown in Figure 9.

The delivery member 36 is formed with a bottom opening 72 and a slide valve 73 having a handle 74 at its outer end is adapted to close the delivery opening 72 and may be moved to open position to permit discharge or delivery of the treated seed or material.

An agitator 75 is disposed in the delivery member 36 and is mounted on a shaft 76 which is journalled in a bearing 77 carried by the frame structure 20. The fluid discharged through the nozzle 48 is selectively metered by means of a pump generally indicated at 78. The pump 78 is formed of a cylinder 79 which is vertically disposed and is movably mounted at its upper end in a guide 80.

The guide 80 is secured within a vertically disposed reservoir 81 which engages loosely about the cylinder 79. The reservoir 81 is mounted on a base plate 82 and fluid is gravitatingly discharged into reservoir 81 by means of a pipe 83a connected with a suitable supply means. The base 82 has a passage 83 which opens within the reservoir 81 and a cone-shaped valve member 84 which is formed with a central bore 85 is mounted in the upper end of passage 83.

Pump cylinder 79 has a bushing 86 mounted interiorly thereof and a gasket 87 is carried by the bushing 86 and is adapted to engage the valve member 84 when cylinder 79 is lowered to valve closing position. Piston 88 is slidable in cylinder 79 and has a piston rod 89 extending upwardly therefrom through a top plate 90 which is loosely mounted on the upper end of reservoir 81.

On the upward movement of piston 88 cylinder 79 will initially move upwardly therewith so that gasket or ring-shaped valve member 87 will be moved to open position. The upward movement of cylinder 79 is limited by means of a stop member 91 which is secured to the guide 80.

The upper end of rod 89 has fixed thereon a U-shaped member 92, and the free end of a leaf spring 93 is secured beneath the U-shaped member 92 by means of a nut 94. Spring 93 is secured by fastening means 95 to a horizontally disposed supporting bar 96 which is carried by means of horizontal supporting member 97 projecting from the wall 28.

The piston rod 89 may have slight lateral movement as it is moved up and down, and spring 93 is adapted to hold rod 89 against undue lateral swinging movement.

A pump operating lever 98 extends loosely through a block 99 which is pivoted as at 100 to the clevis or U-shaped member 92. Lever 98 is endwise adjusted by means of a screw shaft 101 which is threaded into block 99 and rotatably engages through an ear 102 carried by the outer end of lever 98. The outer end of lever 98 is rockably carried by the upper end of a link 103 which at its lower end is rockably mounted through an ear 104 fixed to the reservoir 81.

Lever 98 at its inner end has pivotally secured thereto a link 105 which is pivotally secured to a crank pin 106 mounted on a pulley or wheel 107. The pulley or wheel 107 is secured to the conveyor shaft 108 on which conveyor 25 is fixedly secured.

An upwardly extending and upwardly opening check valve 109 is secured to the base 82 and is in communication with passage 83.

A hose or pipe 110 extends from check valve 109 and is connected by means of a flexible hose 111 to nozzle 48.

The receptacle 37 has connected with the return chamber 46 a return hose or pipe connection 112 which is connected, as shown in Figure 3, to the upper portion of reservoir 81 below the guide 80. In this manner when nozzle 48 is discharging into return chamber 46 the fluid will return to the reservoir 81.

The frame structure 20 has mounted in the base portion 113 thereof a motor or power member 114 having a shaft 115 on which a pulley 116 is mounted. A belt 117 engages about the pulley 116 and about a pulley 118 mounted on a counter shaft 119. Shaft 119 also has secured thereto a small diameter pulley 120 about which a belt 121 engages, and belt 121 engages on pulley element 122 of a speed changing pulley structure.

The speed changing pulley structure, generally indicated at 123 includes a floating intermediate member 124 which is disposed between the pulley member 122 and a pulley member 125. The speed changing pulley structure 123 is mounted on a shaft 126 carried by a bell crank lever 127 which is rockably mounted on a pivot 128 carried by the frame 20.

The bell crank lever 127 has pivotally secured to the upper end thereof a nut member 129 through which a threaded adjusting shaft 130 engages, and shaft 130 has a hand wheel 131 secured to the outer end thereof. Shaft 130 extends through front wall 69 and a pair of lock nuts 132 are adjustably mounted on screw shaft 130 so as to limit the rocking of bell crank 127.

A second counter shaft 133 is journalled in the frame structure 20 and a pulley 134 is fixed on the shaft 133 and has a belt 135 engaging thereabout which also engages about the pulley element 125 of speed changer 123. Shaft 133 has secured to its outer end a pulley 136 about which a belt 137 engages, and belt 137 engages about pulley 107.

Shaft 133 also has fixed thereon a pulley 138 about which a belt 139 engages, and belt 139 also engages about pulley 34. In view of the fact that pulley 34 is mounted on a vertical shaft and shaft 133 is horizontal, a pair of idler pulleys 140 are carried by the upper rear portion of frame 20 and are mounted on a double bracket 141 fixed to the frame 20, as shown in Figure 1.

A tachometer 142 is mounted in the frame structure and is operated by means of a flexible shaft 143 extending through a bearing 144. A pulley 145 is mounted on shaft 143 and has a belt 146 trained thereabout which also engages about a pulley 147 fixed on shaft 133.

Shaft 76 has a pulley 148 fixed thereon about which a belt 149 engages, and belt 149 engages about a relatively small pulley 150 mounted on shaft 133.

In the use and operation of this device, the seed or other material is discharged into the hopper 24 and the fungicide or insecticide is discharged into reservoir 81. With motor 114 operating conveyor 23 will move the seed or other material forwardly and discharge the same onto the discharging disc 31.

At the same time pump 78 will operate so as to pump the liquid through nozzle 48 into receptacle 37. As seed is being moved forwardly through trough 22 fingers 53 will rock shaft 55 clockwise so as to thereby swing nozzle 48 from a normal position discharging into return chamber 46 to a position discharging the liquid in delivery chamber 45.

The liquid will flow gravitatingly downwardly through bore 61 in shaft 32 and drop onto vapor or mist forming disc 62. The seed thrown horizontally outwardly by disc 31 impinging against cylindrical mixing member 25 will drop downwardly through the mist or vapor generated by disc 62 and will then drop downwardly into hopper 35 and delivery member 36.

In the event that no seed is present in trough 22, weight 57 will swing fingers 53 to the right, as viewed in Figure 2, and at this time delivery nozzle 48 will be swung laterally to discharge the liquid into return chamber 46.

It will be apparent from the foregoing that the interior of the mixing chamber 25 and the hopper 35 will not be flooded with liquid when there is no seed in trough 22. The liquid discharged in return chamber 46 will gravitatingly flow back through pipe 112 to reservoir 81.

The length of the stroke of piston 88 may be finely adjusted by adjustment of lever 98 through yoke or block 99. The adjustment of lever 98 relative to yoke 99 will regulate the length of stroke of piston 88 and the amount of liquid which is pumped to receptacle 37.

The machine hereinbefore described provides a means whereby seed of various types may be treated or coated with an insecticide or fungicide so that the seed will germinate in a greater proportion and the plants emanating from the seed will be strong plants.

What is claimed is:

1. A seed treating machine comprising a housing, a tubular distributor shaft journalled vertically in said housing, a disc-shaped seed distributor fixed to the lower end of said shaft, means for rotating said shaft, means delivering seed to said distributor, a disc-shaped ribbed mist generating member below said shaft, an operator for said member, a receptacle at the upper end of said shaft and communicating therewith whereby liquid in said receptacle will gravitatingly flow downwardly through said shaft onto said member, a liquid delivery nozzle discharging into said receptacle, said receptacle having a partition dividing the receptacle into a delivery chamber and a return chamber, said delivery chamber communicating with said shaft, means rockably supporting said nozzle, weight means normally disposing said nozzle in a position discharging liquid into said return chamber, means cooperating with said seed delivering means for disposing said nozzle in a position delivering liquid into said delivery chamber when seed is present in said delivering means, and means delivering liquid insecticide to said nozzle.

2. A seed treating machine comprising a housing, a tubular distributor shaft journalled vertically in said housing, a disc-shaped seed distributor fixed to the lower end of said shaft, means for rotating said shaft, means delivering seed to said distributor, a disc-shaped ribbed mist generating member below said shaft, an operator for said member, a receptacle at the upper end of said shaft and communicating therewith whereby liquid in said receptacle will gravitatingly flow downwardly through said shaft onto said member, a partition in said receptacle dividing said receptacle into a delivery chamber and a return chamber, a liquid delivery nozzle, means pivotally supporting said nozzle, gravity means normally disposing said nozzle in a position for delivery of liquid into said return chamber, means associated with said seed delivering means connected with said nozzle for maintaining said nozzle in a position for discharge of liquid into said delivery chamber when seed is present in said seed delivering means, a pump connected with said nozzle, and a return pipe connected between said return chamber and said pump.

3. A device as claimed in claim 1 in which said means cooperating with said seed delivery means includes a seed engaging member pivotally mounted in said seed delivery means.

4. A device as claimed in claim 2 in which said means associated with said seed delivery means includes means pivotally conecting said seed delivery means and said means associated therewith.

References Cited in the file of this patent
UNITED STATES PATENTS

| | | |
|---|---|---|
| 1,012,915 | Rauber | Dec. 26, 1911 |
| 1,226,108 | Olney | May 15, 1917 |
| 1,646,582 | Halliburton | Oct. 25, 1927 |
| 1,788,345 | Skirvin | Jan. 6, 1931 |
| 2,537,266 | Granberg | Jan. 9, 1951 |